United States Patent Office 3,225,096
Patented Dec. 21, 1965

3,225,096
N-CYCLOPROPYLAMINE ARALKANONE AND ARALKANOL AMINE DERIVATIVES
Jack Mills and Richard W. Kattau, Indianapolis, Ind., assignors to Eli Lilly and Company, Indianapolis, Ind., a corporation of Indiana
No Drawing. Filed Mar. 2, 1964, Ser. No. 348,814
6 Claims. (Cl. 260—570.5)

This invention relates to derivatives of cyclopropylamine. More particularly this invention relates to N-arylketoalkyl and N-arylhydroxyalkyl cyclopropylamines.

The novel compounds of the present invention are represented by the following structural formula:

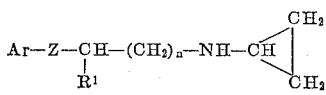

wherein Z represents the grouping

or —CHOH—, $R^1$ is hydrogen or methyl, $n$ is 0 or 1, and Ar is β-naphthyl, phenyl, or phenyl substituted by one or more groups such as trifluoromethyl, methyl, methoxy, or halogen, as for example chlorine, bromine, fluorine, or iodine.

The acid addition salts of the compounds represented by the above general formula also form a part of this invention. The said acid addition salts are generally high-melting crystalline solids and include salts derived from inorganic acids, such as hydrochloric acid, hydrobromic acid, hydriodic acid, nitric acid, nitrous acid, phosphoric acid, sulfuric acid, and the like. Salts with organic acids are likewise within the scope of this invention. Illustrative of the organic acids which may be employed for the preparation of such salts are acetic acid, propionic acid, maleic acid, fumaric acid, benzoic acid, p-toluenesulfonic acid, salicylic acid, mandelic acid, cinnamic acid, p-aminobenzoic acid, ascorbic acid, succinic acid, citric acid, tartaric acid, malic acid, pamoic acid, and like acids. The said salts with organic or inorganic acids can be easily prepared by the conventional methods known in the art, such as by the reaction of the base with the calculated amount of acid in an aqueous solvent system, followed by isolation of the salt by concentration and cooling, or by the reaction of the base with the desired acid in a solvent system from which the desired salt precipitates directly. When volatile acids such as hydrogen chloride and the like are used for the preparation of the addition salts, excess acid can be employed since the excess can be readily removed.

The novel compounds of this invention can be prepared by a variety of methods known in the art. Thus, for example, the N-arylketoalkyl cyclopropylamines can be prepared by one or more of the methods illustrated in the following equations:

(I)
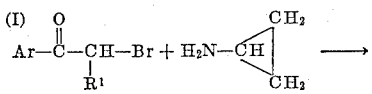

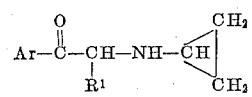

(II)
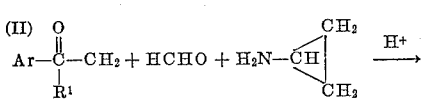

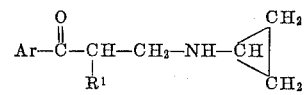

(III)
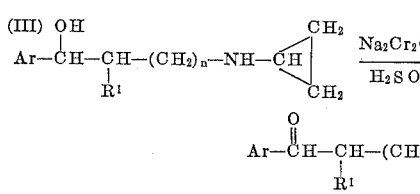

wherein Ar, $R^1$, and $n$ have the meanings heretofore assigned.

In the first method, β-(α-bromoacetyl)naphthalene or an appropriately substituted phenacyl bromide, dissolved or suspended in an inert solvent, is reacted with cyclopropylamine. For optimum yields, two equivalents of the amine must, of course, be employed for each equivalent of the bromo ketone, since the hydrogen bromide eliminated in the reaction immediately forms the hydrobromide salt of the amine. The α-bromo ketones which are not commercially available are suitably prepared by the free radical bromination of β-acetylnaphthalene or an appropriately substituted acetophenone, and can, if desired, be employed as isolated from the reaction mixture without additional purification. The desired acetophenones, where necessary, can be prepared by any of the several suitable methods known in the art. One such method involves the acylation of a malonic ester with a suitably substituted benzoyl halide followed by hydrolysis and decarboxylation of the resulting acylated malonic ester to yield the desired ketone. The following description of the preparation of m-trifluoromethylphenacyl bromide illustrates the general procedure employed in the preparation of the acetophenones and their subsequent bromination to the corresponding α-bromo ketones:

PREPARATION OF m-TRIFLUOROMETHYL-PHENACYL BROMIDE

A mixture of 26 g. of magnesium, 3.1 ml. of carbon tetrachloride, and 31.2 ml. of anhydrous ethanol was stirred until reaction was apparent. One liter of anhydrous ether was added and the mixture was cooled momentarily in an ice bath. A solution containing 213.2 g. of diethyl malonate, 117.5 ml. of anhydrous ethanol and 150 ml. of anhydrous ether was added dropwise at a rate such that vigorous refluxing was maintained. Refluxing was continued until all of the magnesium was dissolved. A solution of 108 g. of m-trifluoromethylbenzoyl chloride (prepared from m-trifluoromethylbenzoic acid and thionyl chloride) in 150 ml. of anhydrous benzene was then added dropwise. The reaction mixture was heated under reflux for two hours after the addition of the acid chloride had been completed, cooled, and poured into a mixture of ice and hydrochloric acid. The organic layer was separated, washed with water, dried, and evaporated in vacuo.

The residue, comprising diethyl m-trifluoromethylbenzoylmalonate, was heated under reflux for six hours with 244.4 ml. of water, 384.8 ml. of acetic acid, and 41.6 ml. of concentrated sulfuric acid. The reaction product mixture was cooled and poured into water and the organic layer was separated and extracted with ether. The combined ether extracts were washed twice with water and were then washed repeatedly with 10 percent aqueous sodium hydroxide solution until the aqueous phase remained basic. After a final water wash, the ether layer was dried, filtered to remove the drying agent and evaporated under vacuum. The residue, comprising m-trifluoromethylacetophenone, was distilled at a pressure of about 0.1 mm. of mercury, and the fraction boiling between about 43 and 60° C. was employed in the bromination step.

By employing the appropriately substituted benzoyl chloride in the above-described procedure, the following substituted acetophenones can be prepared:

2-chloroacetophenone
3-chloroacetophenone
4-chloroacetophenone
3-bromoacetophenone
3-iodoacetophenone
2,4-dichloroacetophenone
3,4-dichloroacetophenone
2,5-dichloroacetophenone
2-fluoro-4-chloroacetophenone
2(5)-fluoro-5(2)-chloroacetophenone
2-methoxyacetophenone
3-methoxyacetophenone
4-methoxyacetophenone
2,4-dimethoxyacetophenone
3,4-dimethoxyacetophenone
2-methylacetophenone
3-methylacetophenone
4-methylacetophenone
2,4-dimethylacetophenone
3,4-dimethylacetophenone
3,5-dimethylacetophenone
2-trifluoromethylacetophenone
4-trifluoromethylacetophenone To a mixture of 27 g. of m-trifluoromethylacetophenone, 0.5 g. of benzoyl peroxide, and about 250 ml. of anhydrous ether were added 22.4 g. of bromine at a dropwise rate such that the bromine color was substantially discharged between drops. When the addition of bromine was completed, the reaction mixture was stirred for an additional hour at room temperature and was then poured onto ice. The organic layer was separated, washed twice with water, and dried. The ether was evaporated under reduced pressure, leaving a residue of m-trifluoromethylphenacyl bromide which was employed without additional purification in the reaction with cyclopropylamine.

The above-described procedure, employed with the appropriately substituted acetophenones, can be used to prepare the bromo ketones listed below. With acetophenones which are not ether soluble, other solvents, such as chloroform, carbon tetrachloride, acetonitrile, and the like, or mixtures of such solvents, can be employed. Among the α-bromo ketones which can be so prepared are the following:

2-chlorophenacyl bromide
3-chlorophenacyl bromide
4-chlorophenacyl bromide
3-bromophenacyl bromide
3-iodophenacyl bromide
2,4-dichlorophenacyl bromide
3,4-dichlorophenacyl bromide
3,5-dichlorophenacyl bromide
2-fluoro-4-chlorophenacyl bromide
2(5)-fluoro-5(2)-chlorophenacyl bromide
2-methoxyphenacyl bromide
3-methoxyphenacyl bromide
4-methoxyphenacyl bromide
2,4-dimethoxyphenacyl bromide
3,4-dimethoxyphenacyl bromide
2-methylphenacyl bromide
3-methylphenacyl bromide
4-methylphenacyl bromide
2,4-dimethylphenacyl bromide
3,4-dimethylphenacyl bromide
3,5-dimethylphenacyl bromide
2-trifluoromethylphenacyl bromide
4-trifluoromethylphenacyl bromide The method employed for the preparation of the β-cyclopropylaminopropiophenones employs the Mannich reaction, involving the reaction of an appropriately substituted acetophenone with formaldehyde and cyclopropylamine in the presence of acid. Among the amino ketones which can be so prepared are the following:

β-Cyclopropylaminopropiophenone
β-Cyclopropylamino-2-trifluoromethylpropiophenone
β-Cyclopropylamino-2,4-dichloropropiophenone
β-Cyclopropylamino-3,4-dichloropropiophenone
α-Methyl-β-cyclopropylamino-3,4-dichloropropiophenone
β-Cyclopropylamino-3,4-dimethylpropiophenone
β-Cyclopropylamino-3,5-dimethylpropiophenone
β-Cyclopropylamino-2,4-dimethoxypropiophenone
β-Cyclopropylamino-3,4-dimethoxypropiophenone
β-Cyclopropylamino-4-trifluoromethylpropiophenone
2-Cyclopropylaminoethyl β-naphthyl ketone Where the amino alcohol corresponding to the desired amino ketone is available, oxidation of the said alcohol by means of an acidic dichromate solution may be employed to prepare the ketone. This method, of course, is limited to compounds which do not contain other substituents susceptible to oxidation.

The amino alcohols of this invention are likewise prepared by known methods, several of which are illustrated by Equations IV and V below:

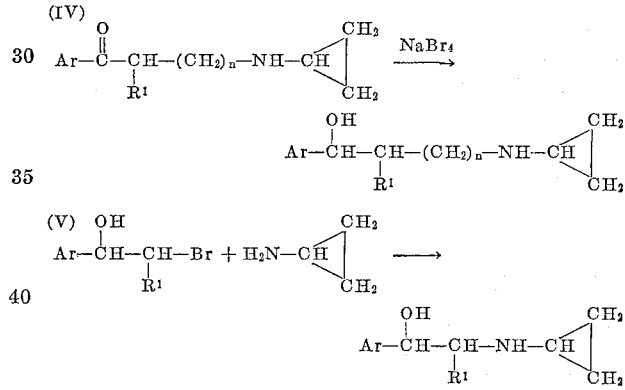

wherein Ar, $R^1$, and $n$ again have the previously assigned meanings.

Conversion of the cyclopropylaminoalkyl aryl ketones to the corresponding amino alcohols is readily effected by reduction. This may be conveniently effected by the well-known technique of reducing ketones to the corresponding carbinols with sodium borohydride.

Alternatively, the desired amino alcohol can be conveniently prepared by the reaction of cyclopropylamine with an appropraitely substituted halohydrin as described in U.S. Patent No. 2,938,921. When a suitable epoxide derivative is available, the said epoxide can be employed with cyclopropylamine to yield the desired amino alcohol. Thus, for example, the reaction of styrene oxide with cyclopropylamine is a convenient method for the preparation of 1-phenyl-2-cyclopropylaminoethanol.

The N-arylketoalkyl and N-arylhydroxyalkyl cyclopropylamines of this invention exhibit a variety of pharmacological properties. They are especially powerful inhibitors of the enzyme monoamine oxidase.

The invention is further described by the illustrative examples which follow. It will be apparent to those skilled in the art that many modifications of the described invention are possible without departing from the spirit thereof.

*Example 1*

A solution of 11.4 g. of cyclopropylamine in about 50 ml. of anhydrous ether was added to a cooled solution of 28.8 g. of 3-trifluoromethylphenacyl bromide in 500 ml. of anhydrous ether at a rate such that gentle refluxing occurred. When the addition was completed, the cooling bath was removed and the reaction mixture was heated at gentle reflux overnight. The solid precipitate of cyclopropylamine hydrobromide which separated was removed by filtration and the clear filtrate was treated with anhydrous hydrogen bromide in order to precipitate the salt of the amino ketone. The solid salt was washed with ether, dissolved in hot acetone, and chilled. The crystalline N-(3-trifluoromethylphenacyl)cyclopropylamine hydrobromide so obtained was recrystallized from a mixture of ethanol and ethyl acetate to give material melting at about 224–225° C. with decomposition. *Analysis.*—Calc.: C, 44.46; H, 4.04. Found: C, 44.44; H, 4.12.

By employing the appropriately substituted phenacyl bromide with cyclopropylamine in the above-described procedure, the following amino ketones were prepared and isolated in the form of the indicated salts:

N-phenacylcyclopropylamine hydrobromide, M.P. about 206° C. with decomposition, from phenacyl bromide. *Analysis.*—Calc.: C, 51.58; H, 5.50. Found: C, 51.85; H, 5.62.

N-(2-chlorophenacyl)cyclopropylamine hydrobromide, M.P. about 191–192° C., from 2-chlorophenacyl bromide. *Analysis.*—Calc.: C, 45.46; H, 4.50. Found: C, 45.55; H, 4.60.

N-(3-chlorophenacyl)cyclopropylamine hydrobromide, M.P. about 223° C. with decomposition, from 3-chlorophenacyl bromide. *Analysis.*—Calc.: C, 45.46; H, 4.50. Found: C, 45.34; H, 4.40.

N-(4-chlorophenacyl)cyclopropylamine hydrobromide, M.P. about 224° C. with decomposition, from 4-chlorophenacyl bromide. *Analysis.*—Calc.: C, 45.46; H, 4.54. Found: C, 45.48; H, 4.73.

N-(3-iodophenacyl)cyclopropylamine hydrobromide, M.P. about 215° C. with decomposition, from 3-iodophenacyl bromide. *Analysis.*—Calc.: C, 34.58; H, 3.42. Found: C, 34.37; H, 3.50.

N-(2,4-dichlorophenacyl)cyclopropylamine hydrobromide, M.P. about 211–212° C. with decomposition, from 2,4-dichlorophenacyl bromide. *Analysis.*—Calc.: C, 40.64; H, 3.72. Found: C, 40.89; H, 4.03.

N-(3,4-dichlorophenacyl)cyclopropylamine hydrochloride, M.P. about 215–217° C. with decomposition, from 3,4-dichlorophenacyl chloride. *Analysis.*—Calc.: C, 47.08; H, 4.28. Found: C, 47.74; H, 4.60.

N-(2,5-dichlorophenacyl)cyclopropylamine hydrobromide, M.P. about 210° C. with decomposition, from 2,5-dichlorophenacyl bromide. *Analysis.*—Calc.: C, 40.64; H, 3.72. Found: C, 40.78; H, 3.76.

N-(3,4-dichloro-α-methylphenacyl)cyclopropylamine hydrobromide, M.P. about 229° C. with decomposition, from 3,4-dichloro-α-methylphenacyl bromide. *Analysis.*—Calc.: C, 42.50; H, 4.16. Found: C, 42.12; H, 4.13.

N-(2-fluoro-4-chlorophenacyl)cyclopropylamine hydrobromide, M.P. about 204° C. with decomposition, from 2-fluoro-4-chlorophenacyl bromide. *Anaylsis.*—Calc.: C, 42.81; H, 3.91. Found C, 42.85; H, 3.95.

N-[2(5)-fluoro-5(2)-chlorophenacyl]cyclopropylamine hydrobromide, M.P. about 206° C. with decomposition, from 2(5)-fluoro-5(2)-chlorophenacyl bromide. *Analysis.*—Calc.: C. 42.81; H, 3.91. Found: C, 43.02; H, 4.06.

N-(2-trifluoromethylphenacyl)cyclopropylamine hydrobromide, M.P. about 210° C. with decomposition, from 2-trifluoromethylphenacyl bromide. *Analysis.*— Calc.: C, 44.46; H, 4.04. Found: C, 44.20; H, 4.33.

N-(4-trifluoromethylphenacyl)cyclopropylamine hydrobromide, M.P. about 237° C. with decomposition, from 4-trifluoromethylphenacyl bromide. *Analysis.*—Calc.: C, 44.46; H, 4.04. Found C, 44.72; H, 4.20.

N-(2,4-dimethylphenacyl)cyclopropylamine hydrobromide, M.P. about 213–214° C. with decomposition from 2,4-dimethylphenacyl bromide. *Analysis.*—Calc.: C, 54.94; H, 6.38. Found: C, 55.18; H, 6.58.

N-(3,5-dimethylphenacyl)cyclopropylamine hydrobromide, M.P. about 238° C. with decomposition, from 3,5-dimethylphenacyl bromide. *Analysis.*—Calc.: C, 54.94; H, 6.38. Found: C, 55.14; H, 6.59.

N-(3-methoxyphenacyl)cyclopropylamine hydrobromide, M.P. about 171–173° C., from 3-methoxyphenacyl bromide. *Analysis.*—Calc.: C, 50.30; H, 5.63. Found: C, 50.45; H, 5.82.

N-(4-methoxyphenacyl)cyclopropylamine hydrobromide, M.P. about 178–180° C., from 4-methoxyphenacyl bromide. *Analysis.*—Calc.: C, 50.30; H, 5.63. Found: C, 50.35; H, 5.75.

N-(2,4-dimethoxyphenacyl)cyclopropylamine hydrobromide, M.P. about 203° C. with decomposition, from 2,4-dimethoxyphenacyl bromide. *Analysis.*—Calc.: C, 49.38; H, 5.73. Found: C, 49.49; H, 5.85.

N-(2,5-dimethoxyphenacyl)cyclopropylamine hydrobromide, M.P. about 182–183° C., from 2,5-dimethoxyphenacyl bromide. *Analysis.*—Calc.: C, 49.38; H, 5.73. Found: C, 49.21; H, 5.82.

N-[2-oxo-2(β-naphthyl)ethyl]cyclopropylamine hydrobromide, M.P. about 249° C. with decomposition, from 2-bromoacetylnaphthalene. *Analysis.*—Calc.: C, 51.35; H, 4.04. Found: C, 51.46; H, 4.03.

*Example 2*

A mixture of 12 g. of acetophenone, 4.5 g. of paraformaldehyde, 13.8 g. of cyclopropylamine hydrobromide, and 50 ml. of ethanol containing one drop of 48 percent aqueous hydrobromic acid is heated to reflux and maintained at refluxing temperature for about two hours. An additional 3 g. of paraformaldehyde are added, and refluxing is resumed and continued overnight. The ethanol is removed in vacuo and the residual oil is dissolved in hot acetone. Upon cooling, crystallization of 3-cyclopropylaminopropiophenone hydrobromide occurs. The amine salt, after recrystallization from a mixture of ethanol and ethyl acetate, melts at about 186–187° C. *Analysis.*—Calc.: C, 53.34; H, 5.96. Found: C, 54.05; H, 6.35.

By following the above procedure, or a slight modification thereof, other 3-cyclopropylaminopropiophenones are obtained. In some cases, some of the bis derivative is formed and precipitates from the reaction mixture. When this occurs, the reaction mixture is filtered to remove the bis compound prior to evaporation of the solvent.

The following compounds are prepared by employing the above-described procedure:

3-cyclopropylamino-4'-trifluoromethylpropiophenone hydrobromide, M.P. about 203–204° C., from 4-trifluoromethylacetophenone.

3-cyclopropylamino-2',4'-dichloropropiophenone hydrobromide, M.P. about 152–153° C., from 2,4-dichloroacetophenone. *Analysis.* — Calc.: C, 42.50; H, 4.16. Found: C, 42.53; H, 4.19.

3-cyclopropylamino-3',4'-dichloropropiophenone hydrobromide, M.P. about 192° C., from 3,4-dichloroacetophenone. *Analysis.*—Calc.: C, 42.50; H, 4.16. Found: C, 42.68; H, 4.30.

3-cyclopropylamino-3',4'-dimethylpropiophenone hydrobromide, M.P. about 152–153° C., from 3,4-dimethylacetophenone.

3-cyclopropylamino-3',5'-dimethylpropiophenone hydrobromide, M.P. about 177–178° C., from 3,5-dimethylacetophenone. *Analysis.*—Calc.: C, 56.38; H, 6.75. Found: C, 56.54; H, 6.88.

3-cyclopropylamino-2',4'-dimethoxypropiophenone hydrobromide, M.P. about 154–156° C., from 2,4-dimethoxyacetophenone. *Analysis.*—Calc.: C, 50.92; H, 6.10. Found: C, 51.16; H, 6.21.

3-cyclopropylamino-3',4'-dimethoxypropiophenone hydrobromide, M.P. about 161–162° C., from 3,4-dimethoxyacetophenone.

3-cyclopropylamino-3',4',5'-trimethoxypropiophenone hydrobromide, M.P. about 165–166° C., from 3,4, 5-trimethoxyacetophenone. *Analysis.*—Calc.: C, 50.01; H, 6.15. Found: C, 50.22; H, 6.30.

N - [3-oxo - 3(β - naphthyl)propyl]cyclopropylamine hydrobromide, M.P. about 181–183° C., from β-acetylnaphthalene.

*Example 3*

To a solution of 2.7 g. of N-(3-trifluoromethylphenacyl)cyclopropylamine hydrobromide in methanol were added portionwise 2.7 g. of sodium borohydride. Stirring was continued for two hours after the addition of borohydride had been completed, and the reaction mixture was then poured into water which had been made weakly acidic by the addition of dilute hydrochloric acid. The entire mixture was then made basic by the addition of aqueous sodium hydroxide solution, and the product was extracted with ether. The ether layer was separated, washed with water, dried, and filtered to remove the drying agent. The filtrate was treated with anhydrous hydrogen chloride to precipitate the hydrochloride salt of 1 - (3' - trifluoromethylphenyl) - 2 - cyclopropylaminoethanol melting at about 136–138° C. *Analysis.*—Calc.: C, 51.16; H, 5.36. Found: C, 51.45; H, 5.62.

By following the above procedure with suitably substituted cyclopropylaminoacetophenones, the following amino alcohols can be prepared:

1 - (2' - chlorophenyl) - 2 - cyclopropylaminoethanol hydrochloride, M.P. about 173–174° C. *Analysis.*—Calc.: C, 53.24; H, 6.09. Found: C, 53.39; H, 6.17.

1 - (3' - chlorophenyl) - 2 - cyclopropylaminoethanol hydrochloride, M.P. about 147–149° C. *Analysis.*—Calc.: C, 53.24; H, 6.09. Found: C, 53.18; H, 6.19.

1 - (3' - iodophenyl) - 2 - cyclopropylaminoethanol hydrochloride, M.P. about 161° C. *Analysis.*—Calc.: C, 38.90; H, 4.45. Found: C, 38.89; H, 4.48.

1 - (2',4' - dichlorophenyl) - 2 - cyclopropylaminoethanol hydrochloride, M.P. about 193–194° C. *Analysis.*—Calc.: C, 46.75; H, 4.99. Found: C, 47.08; H, 5.25.

1 - (2',5' - dichlorophenyl) - 2 - cyclopropylaminoethanol hydrochloride, M.P. about 206–207° C.

1 - (2' - fluoro - 4' - chlorophenyl) - 2 - cyclopropylaminoethanol hydrochloride, M.P. about 196–197° C. *Analysis.*—Calc.: C, 49.64; H, 5.30. Found: C, 49.83; H, 5.57.

1 - [2'(5') - fluoro - 5'(2') - chlorophenyl] - 2 - cyclopropylaminoethanol hydrochloride, M.P. about 141–143° C. *Analysis.*—Calc.: C, 49.64; H, 5.30. Found: C, 49.88; H, 5.43.

1 - (3' - methoxyphenyl) - 2 - cyclopropylaminoethanol hydrochloride, M.P. about 174–175° C. *Analysis.*—Calc.: C, 59.13; H, 7.44. Found: C, 59.24; H, 7.59.

1 - (2',4' - dimethylphenyl) - 2 - cyclopropylaminoethanol hydrochloride, M.P. about 119–120° C.

When the same procedure is employed with substituted cyclopropylaminopropiophenones, the corresponding amino alcohols are obtained. The following compounds are prepared in this manner.

1 - (2' - trifluoromethylphenyl) - 3 - cyclopropylaminopropanol-1 hydrochloride, M.P. about 189.5–190.5° C. *Analysis.*—Calc.: C, 52.79; H, 5.79. Found: C, 52.95; H, 5.89.

1 - (3' - trifluoromethylphenyl) - 3 - cyclopropylaminopropanol-1 hydrochloride, M.P. about 161–162° C. *Analysis.*—Calc.: C, 52.79; H, 5.79. Found: C, 52.87; H, 5.89.

1 - (4' - trifluoromethylphenyl) - 3 - cyclopropylaminopropanol-1 hydrochloride, M.P. about 209.5–210.5° C. *Analysis.*—Calc.: C, 52.79; H, 5.79. Found: C, 52.77; H, 5.80.

1 - (3' - chlorophenyl) - 3 - cyclopropylaminopropanol-1 hydrochloride, M.P. about 138–139° C. *Analysis.*—Calc.: C, 54.97; H, 6.53. Found: C, 55.28; H, 6.54.

1 - (2',5' - dichlorophenyl) - 3 - cyclopropylaminopropanol-1 hydrochloride, M.P. about 149–150° C. *Analysis.*—Calc.: C, 48.59; H, 5.43. Found: C, 48.58; H, 5.46.

1 - phenyl - 3 - cyclopropylaminopropanol - 1 hydrochloride, M.P. about 132–134° C. *Analysis.*—Calc.: C, 63.28; H, 7.96. Found: C, 63.15; H, 8.07.

1 - (β - naphthyl) - 3 - cyclopropylaminopropanol - 1 hydrochloride, M.P. about 152–153° C. *Analysis.*—Calc.: C, 69.17; H, 7.25. Found: C, 69.37; H, 7.35.

*Example 4*

A mixture containing 13.4 g. of 1-(2'-trifluoromethylphenyl)-2-bromoethanol, 5.7 g. of cyclopropylamine and 10 ml. of dimethylformamide is prepared and allowed to stand at room temperature overnight. The reaction mixture is heated under reflux for two hours and is then poured into dilute aqueous hydrochloric acid. The mixture is washed with ether and the ether layer in turn is extracted with 10 percent aqueous hydrochloric acid. The combined acidic solutions are cooled in an ice bath and made strongly basic with aqueous sodium hydroxide solution. The organic layer is taken up in ether and the ether solution is washed with water and dried over anhydrous magnesium sulfate. After removal of the drying agent by filtration and evaporation of the solvent in vacuo, the residual oil is distilled. The distillate is dissolved in anhydrous ether and treated with dry hydrogen chloride to precipitate the hydrochloride salt of 1-(2'-trifluoromethylphenyl)-2-cyclopropylaminoethanol, which melts at about 192–193° C. *Analysis.*—Calc.: C, 51.16; H, 5.36. Found: C, 51.10; H, 5.62.

By employing other suitably substituted bromohydrins, the following compounds can be prepared by employing the above procedure:

1-(4'-trifluoromethylphenyl)-2 - cyclopropylaminoethanol hydrochloride, M.P. about 156–157° C. *Analysis*—Calc.: C, 51.16; H, 5.36. Found: C, 51.32; H, 5.49.

1-(3',4'-dichlorophenyl) - 2 - cyclopropylaminoethanol hydrochloride, M.P. about 176–178° C. *Analysis.*—Calc.: N, 4.95; Cl 37.63. Found: N, 5.07; Cl, 37.28.

1-(3',4'-dibromophenyl) - 2 - cyclopropylaminoethanol hydrochloride, M.P. about 193–195° C. *Analysis.*—Calc.: C, 35.55; H, 3.79. Found: C, 36.19; H, 4.20.

1-(2',5'-dimethoxyphenyl)-2 - cyclopropylaminoethanol hydrochloride, M.P. about 162–163° C. *Analysis.*—Calc.: C, 57.04; H, 7.36. Found: C, 56.99; H, 7.26.

1-(β-naphthyl) - 2 - cyclopropylaminoethanol hydrochloride, M.P. about 175–177° C. *Analysis.*—Calc.: C, 68.30; H, 6.87. Found: C, 68.33; H, 6.98.

*Example 5*

A mixture of 5 g. of styrene oxide and 5 g. of cyclopropylamine was sealed in a Carius tube and heated at about 100° C. for six hours. After cooling, the tube was opened and the contents were distilled under reduced pressure. The 1-phenyl-2-cyclopropylaminoethanol, which distilled between about 97 and 115° C. at about 0.07 mm., was converted to its hydrochloride salt, which, after recrystallization from a mixture of ethanol and ether, melted at about 130–134° C. *Analysis.*—Calc.: C, 61.82; H, 7.54. Found: C, 61.77; H, 7.48.

*Example 6*

A suspension of 3 g. of 1-(β-naphthyl)-2-cyclopropylaminoethanol hydrochloride in 5.25 ml. of water and 0.57 ml. of concentrated sulfuric acid was stirred at room temperature while a solution of 1.09 g. of sodium dichromate in 1.46 ml. of concentrated sulfuric acid was added dropwise during about a half hour. The reaction mixture was stirred for an additional four hours and was then made strongly alkaline by the addition of 50 percent aqueous sodium hydroxide and ice. The resulting mixture was extracted with chloroform and then with ether, and the combined extracts were dried and filtered to remove the drying agent. Anhydrous hydrogen chloride was then bubbled into the dried filtrate, after which the solvents were removed by evaporation in vacuo. The residue was crystallized by the addition of acetone and was then recrystallized from a solvent mixture of ethanol and ether to give a product identical to that obtained by the procedure of Example 1.

We claim:
1. A compound of the group having the formula

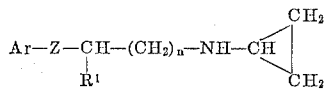

and the salts thereof with physiologically acceptable acids, wherein Z is a member of the group consisting of

and —CHOH—, $R^1$ is a member of the group consisting of hydrogen and methyl, $n$ is a number from 0 to 1, and Ar is a member of the group consisting of β-naphthyl, phenyl, and phenyl substituted by one to three substituents selected from the group consisting of halogen, trifluoromethyl, methyl, and methoxy.

2. N-(3,4-dichlorophenacyl)cyclopropylamine.
3. 1-(2'-chlorophenyl)-2-cyclopropylaminoethanol.
4. 1-(4'trifluoromethylphenyl) - 2 - cyclopropylaminoethanol.
5. β-Cyclopropylamino-2,4-dimethoxypropiophenone.
6. 1-(β-naphthyl)-3-cyclopropylaminopropanol-1.

References Cited by the Examiner
UNITED STATES PATENTS

| | | | |
|---|---|---|---|
| 2,776,993 | 1/1957 | Alles | 260—570.6 |
| 2,900,415 | 8/1959 | Biel | 260—570.5 X |
| 3,098,010 | 7/1963 | Everett et al. | 260—570.6 X |

OTHER REFERENCES

Burger: "Medicinal Chemistry," 2nd ed., pages 75 and 597 (1960).

Kaiser et al.: "Jour. of Medicinal and Pharm. Chem.," vol. 5, No. 6, pages 1243–65 (1962).

CHARLES B. PARKER, *Primary Examiner*.